(12) United States Patent
Kim et al.

(10) Patent No.: US 10,170,214 B2
(45) Date of Patent: Jan. 1, 2019

(54) ECO-FRIENDLY THERMOPLASTIC RESIN COMPOSITION HAVING EXCELLENT ELECTRO-PLATING PROPERTY

(71) Applicant: Korea Kumho Petrochemical Co., Ltd., Seoul (KR)

(72) Inventors: Ho Soo Kim, Daejeon (KR); Sup Joo Lee, Daejeon (KR); Hyung Jin Kim, Daejeon (KR); Joon Hee Jung, Daejeon (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 46 days.

(21) Appl. No.: 15/380,434

(22) Filed: Dec. 15, 2016

(65) Prior Publication Data

US 2017/0194069 A1 Jul. 6, 2017

(30) Foreign Application Priority Data

Dec. 30, 2015 (KR) .......................... 10-2015-0189703

(51) Int. Cl.
*H01B 1/24* (2006.01)
*C08L 69/00* (2006.01)

(52) U.S. Cl.
CPC ................ *H01B 1/24* (2013.01); *C08L 69/00* (2013.01); *C08L 2205/03* (2013.01)

(58) Field of Classification Search
CPC .......... C08L 25/12; C08L 55/02; C08L 69/00; C08L 2205/03; H01B 1/24
See application file for complete search history.

(56) References Cited

U.S. PATENT DOCUMENTS

| 6,503,628 B1* | 1/2003 | Janarthanan | ............ C08L 69/00 428/412 |
|---|---|---|---|
| 2004/0152808 A1* | 8/2004 | Tezuka | .................. C08F 257/02 524/127 |
| 2010/0276289 A1* | 11/2010 | Tezuka | .................... C08L 25/12 205/50 |
| 2017/0190909 A1* | 7/2017 | Saegusa | .................. C08L 69/00 |

FOREIGN PATENT DOCUMENTS

WO WO-2016103160 A1 * 6/2016 ............. C08L 55/02

* cited by examiner

*Primary Examiner* — Mark Kopec
*Assistant Examiner* — Jaison P Thomas
(74) *Attorney, Agent, or Firm* — H.C. Park & Associates, PLC

(57) ABSTRACT

A thermoplastic resin composition including 10 to 35 wt % of a first graft copolymer resin in which 55 to 65 parts by weight of a diene-based rubber polymer and 35 to 45 parts by weight of a monomer mixture, in which an aromatic vinyl monomer and a vinyl cyanide monomer are mixed in a weight ratio of 60 to 80:20 to 40 respectively, are graft-polymerized, 10 to 30 wt % of a first copolymer resin in which an aromatic vinyl monomer and a vinyl cyanide monomer are copolymerized in a weight ratio of 60 to 80:20 to 40 respectively, 30 to 75 wt % of a polycarbonate resin, and 2 to 8 wt % of a conductive filler.

9 Claims, 2 Drawing Sheets

ECO-FRIENDLY THERMOPLASTIC RESIN COMPOSITION HAVING EXCELLENT ELECTRO-PLATING PROPERTY

CROSS-REFERENCE TO RELATED APPLICATION

This application claims priority from and the benefit of Korean Patent Application No. 10-2015-189703, filed on Dec. 30, 2015, which is hereby incorporated by reference for all purposes as if fully set forth herein.

BACKGROUND

Field

The present invention relates to an eco-friendly thermoplastic resin composition having an excellent electro-plating property.

Discussion of the Background

In accordance with a recent trend toward lighter and higher-quality vehicles, a plurality of products in which a thermoplastic resin is subjected to plating treatment have been used. Among these thermoplastic resins, acrylonitrile butadiene styrene (ABS) and polycarbonate-ABS (PC-ABS) resins have been widely used due to their excellent formability and plating properties.

As a method of plating a surface of plastic, a method in which a metal catalyst nucleus is attached to a surface of plastic, the surface is then treated with a diluted acidic solution, a conductive film is formed thereon through electroless copper plating or electroless nickel plating, and then electro-plating is performed has been suggested and commonly used.

However, since a plating solution used in electroless copper plating includes formaldehyde known as a carcinogen, an operator may be adversely affected. Also, when a copper plating solution is prepared, a strong complexing agent such as ethylenediaminetetraacetic acid (EDTA) is used to dissolve copper ions in an alkaline solution, and therefore a plurality of processes such as filtration, activated carbon treatment, ion exchange, and the like are involved to remove copper ions in a wastewater treatment operation, thereby decreasing processing efficiency.

In addition, hypophosphite included in a plating solution used in electroless nickel plating is converted into a phosphite through oxidation, and as a result, use of this method may lead to conflict with environmental regulations on a phosphorus component and cause problems such as environmental pollution due to a high COD level of wastewater discharged in a plating process.

Accordingly, the development of a thermoplastic resin composition that can appropriately manage problems such as deterioration in health of an operator, environmental pollution, and a decrease in processing efficiency occurring in a process of plating a plastic is necessary.

SUMMARY

The present invention is designed to solve previous problems, and it is an object of the present invention to provide an eco-friendly thermoplastic resin composition which has an excellent electro-plating property and does not require an electroless plating process when a metal film or an alloy film is formed by electro-plating.

Additional features of the invention will be set forth in the description which follows, and in part will be apparent from the description, or may be leaned by practice of the invention.

An exemplary embodiment provides a thermoplastic resin composition which includes 10 to 35 wt % of a first graft copolymer resin in which 55 to 65 parts by weight of a diene-based rubber polymer and 35 to 45 parts by weight of a monomer mixture, in which an aromatic vinyl monomer and a vinyl cyanide monomer are mixed in a weight ratio of 60 to 80:20 to 40 respectively, are graft-polymerized; 10 to 30 wt % of a first copolymer resin in which an aromatic vinyl monomer and a vinyl cyanide monomer are copolymerized in a weight ratio of 60 to 80:20 to 40 respectively; 30 to 75 wt % of a polycarbonate resin; and 2 to 8 wt % of a conductive filler.

In an exemplary embodiment, the first graft copolymer resin may have a graft ratio of 30 to 40%.

In an exemplary embodiment, the thermoplastic resin composition may further include 1 to 12 wt % of a second graft copolymer resin in which 45 to 55 parts by weight of a diene-based rubber polymer and 45 to 55 parts by weight of a monomer mixture, in which an aromatic vinyl monomer and a vinyl cyanide monomer are mixed in a weight ratio of 60 to 80:20 to 40 respectively, are graft-polymerized.

In an exemplary embodiment, the second graft copolymer resin may have a graft ratio of 65 to 75%.

In an exemplary embodiment, the first copolymer resin may have a weight average molecular weight of 110,000 to 150,000.

In an exemplary embodiment, the thermoplastic resin composition may further include 1 to 15 wt % of a second copolymer resin in which an aromatic vinyl monomer and a vinyl cyanide monomer are copolymerized in a weight ratio of 60 to 80:20 to 40 respectively and which has a weight average molecular weight of 80,000 to 110,000.

In an exemplary embodiment, the diene-based rubber polymer may be polybutadiene or polyisoprene.

In an exemplary embodiment, the aromatic vinyl monomer may be one selected from the group consisting of styrene, α-methylstyrene, α-ethylstyrene, vinyl toluene, p-bromostyrene, p-chlorostyrene, tert-butylstyrene, dimethylstyrene, and a mixture of two or more thereof.

In an exemplary embodiment, the vinyl cyanide monomer may be one selected from the group consisting of acrylonitrile, methacrylonitrile, ethacrylonitrile, and a mixture of two or more thereof.

In an exemplary embodiment, the polycarbonate resin may be one selected from the group consisting of a bisphenol-A-polycarbonate resin, a tetramethyl-polycarbonate resin, a bisphenol-Z-polycarbonate resin, a tetrabromo-polycarbonate resin, a tetraacrylo-polycarbonate resin, and a mixture of two or more thereof.

In an exemplary embodiment, the polycarbonate resin may have a weight average molecular weight of 10,000 to 40,000.

In an exemplary embodiment, the conductive filler may be one selected from the group consisting of carbon nanotubes, a fullerene, graphene, graphite, carbon fiber, carbon black, and a mixture of two or more thereof.

According to an aspect of the present invention, the thermoplastic resin composition can attain conductivity by adding a conductive filler thereto, and thus an electroless plating process can be omitted during plating. Accordingly, an eco-friendly property and a electro-plating property can be improved.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF EXEMPLARY EMBODIMENTS

Figure 1:
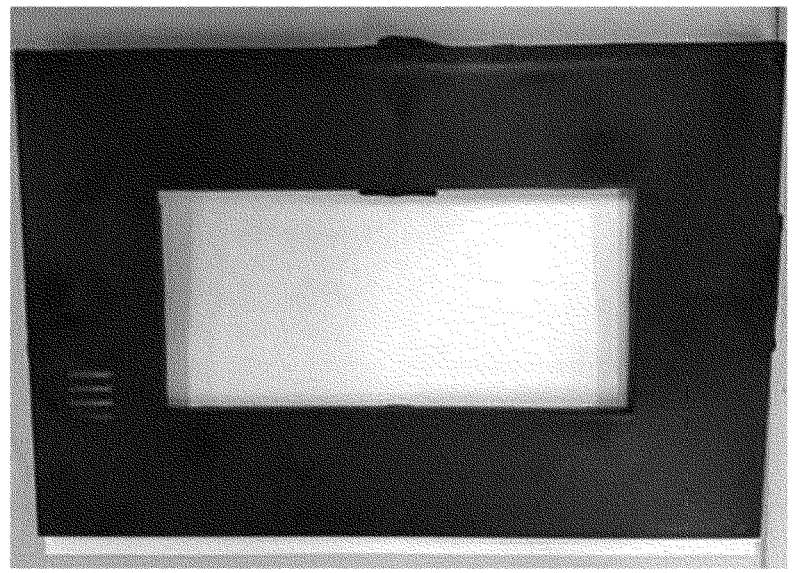
FIG. 1 is an image of a plastic molded product manufactured from a thermoplastic resin composition according to an exemplary embodiment before electro-plating.

Hereinafter, exemplary embodiments of the present disclosure will be described in detail with reference to the accompanying drawings. Throughout the specification, like reference numerals denote like elements having the same or similar functions. Detailed description of components or functions apparent to those skilled in the art will be omitted for clarity. It should be understood that the following exemplary embodiments are provided by way of example and that the present disclosure is not limited to the exemplary embodiments disclosed herein and can be implemented in different forms by those skilled in the art.

When an element is referred to as being "on," "connected to," or "coupled to" another element, it may be directly on, connected to, or coupled to the other element or intervening elements or layers may be present. When, however, an element is referred to as being "directly on," "directly connected to," or "directly coupled to" another element, there are no intervening elements present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms "first," "second," etc. may be used herein to describe various elements, components, regions, and/or sections, these elements, components, regions, and/or sections should not be limited by these terms. These terms are used to distinguish one element, component, region, and/or section from another element, component, region, and/or section. Thus, a first element, component, region, and/or section discussed below could be termed a second element, component, region, and/or section without departing from the teachings of the present disclosure.

The terminology used herein is for the purpose of describing particular exemplary embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

A thermoplastic resin composition according to an exemplary embodiment may include 10 to 35 wt % of a first graft copolymer resin in which 55 to 65 parts by weight of a diene-based rubber polymer and 35 to 45 parts by weight of a monomer mixture, in which an aromatic vinyl monomer and a vinyl cyanide monomer are mixed in a weight ratio of 60 to 80:20 to 40 respectively, are graft-polymerized; 10 to 30 wt % of a first copolymer resin in which an aromatic vinyl monomer and a vinyl cyanide monomer are copolymerized in a weight ratio of 60 to 80:20 to 40 respectively; 30 to 75 wt % of a polycarbonate resin; and 2 to 8 wt % of a conductive filler.

(1) Graft Copolymer Resin (1-1) First Graft Copolymer Resin

The first graft copolymer resin may be a resin in which 55 to 65 parts by weight of a diene-based rubber polymer and 35 to 45 parts by weight of a monomer mixture, in which an aromatic vinyl monomer and a vinyl cyanide monomer are mixed in a weight ratio of 60 to 80:20 to 40 respectively, are graft-polymerized, and a content thereof may be in a range of 10 to 35 wt % with respect to the total weight of the thermoplastic resin composition.

As the diene-based rubber polymer, for example, a butadiene/aromatic vinyl compound copolymer such as polybutadiene, a butadiene/styrene copolymer, and a butadiene/vinyl toluene copolymer; a butadiene/vinyl cyanide compound copolymer such as a butadiene/acrylonitrile copolymer and a butadiene-methacrylonitrile copolymer; or polyisoprene may be used, or a mixture of two or more thereof may be used as necessary.

In addition, when a content of the diene-based rubber polymer is less than 55 parts by weight, mechanical properties such as impact resistance may be degraded due to a decrease in a content of rubber latex in the thermoplastic resin composition. On the other hand, when a content thereof is greater than 65 parts by weight, formability and plating adhesion may be degraded due to excessive aggregation between particles.

As a method of preparing the diene-based rubber polymer, an emulsion polymerization method may be preferably used in consideration of ease of adjustment of a particle diameter, but the present invention is not limited thereto. As a catalyst, an emulsifying agent, and the like used in the emulsion polymerization, known materials may be used.

The first graft copolymer resin is a resin in which the diene-based rubber polymer and the monomer mixture are graft-polymerized. As a polymerization method for preparing the same, for example, one or a combination of two or more of known methods such as emulsion polymerization, suspension polymerization, solution polymerization, and bulk polymerization may be used.

In the graft polymerization, the monomer mixture may be added together with a known emulsifying agent, polymerization initiator, catalyst, and the like, or may be consecutively added over a predetermined time as necessary. A graft copolymer resin first obtained by the graft polymerization is in the form of latex, but is treated with an acid or a salt, solidified, and dried to finally obtain a resin as solid in a powder state.

The monomer mixture may be a mixture in which an aromatic vinyl monomer and a vinyl cyanide monomer are mixed in a weight ratio of 60 to 80:20 to 40 respectively, and a monovinyl monomer that can be copolymerized therewith may be further added and mixed in a range of 0 to 20 wt % as necessary.

When a content of the vinyl cyanide monomer is less than 20 wt % with respect to the total weight of the monomer mixture, the mixture is not easily mixed with a styrene acrylonitrile (SAN) resin produced by the bulk or solution polymerization method and impact resistance of a plastic molded product as a final product may be significantly degraded. On the other hand, even when a content thereof is greater than 40 wt %, the mixture is not easily mixed with a SAN resin produced by the bulk or solution polymerization method and surface characteristics may be degraded by a yellowing phenomenon occurring during molding at high temperature.

The aromatic vinyl monomer may be one selected from the group consisting of styrene, α-methylstyrene, α-ethylstyrene, vinyl toluene, p-bromostyrene, p-chlorostyrene, tert-butylstyrene, dimethylstyrene, and a mixture of two or more thereof, and may preferably be styrene, but the present invention is not limited thereto.

The vinyl cyanide monomer may be one selected from the group consisting of acrylonitrile, methacrylonitrile, ethacrylonitrile, and a mixture of two or more thereof, and may preferably be acrylonitrile, but the present invention is not limited thereto.

In addition, the monovinyl monomer may be one selected from the group consisting of maleimide, N-methylmaleimide, N-ethylmaleimide, N-propylmaleimide, N-phenylmaleimide, methyl methacrylate, methyl acrylate, butyl acrylate, acrylic acid, maleic anhydride, and a mixture of two or more thereof.

The first graft copolymer resin may have a graft ratio of 30 to 40%. When the first graft copolymer resin has a graft ratio outside this range, dispersibility of the thermoplastic resin composition is degraded, and therefore formability and plating adhesion may be degraded.

(1-2) Second Graft Copolymer Resin

The thermoplastic resin composition may further include 1 to 12 wt % of a second graft copolymer resin in which 45 to 55 parts by weight of a diene-based rubber polymer and 45 to 55 parts by weight of a monomer mixture, in which an aromatic vinyl monomer and a vinyl cyanide monomer are mixed in a weight ratio of 60 to 80:20 to 40 respectively, are graft-polymerized. That is, as the graft copolymer resin, the same type may be used alone or may be used in combination with a different type having a different content of a diene-based rubber polymer as necessary. Specifically, when the thermoplastic resin composition is used in combination with a second graft copolymer resin having a relatively low content of a diene-based rubber polymer compared to the first graft copolymer resin, plating adhesion may be further improved.

When a content of the second graft copolymer resin is greater than 12 wt % with respect to the total weight of the thermoplastic resin composition, plating adhesion and a plating appearance property of a plastic molded product as a final product may be degraded.

The second graft copolymer resin may have a graft ratio of 65 to 75%. When the second graft copolymer resin has a graft ratio outside this range, dispersibility of the thermoplastic resin composition is degraded, and therefore formability and plating adhesion may be degraded.

Additionally, types and contents of the aromatic vinyl monomer and the vinyl cyanide monomer are the same as described above.

(2) Copolymer Resin (2-1) First Copolymer Resin

The first copolymer resin may be a resin in which an aromatic vinyl monomer and a vinyl cyanide monomer are copolymerized in a weight ratio of 60 to 80:20 to 40 respectively, and a content thereof may be 10 to 30 wt % with respect to the total weight of the thermoplastic resin composition. Types and contents of the aromatic vinyl monomer and the vinyl cyanide monomer are the same as described above.

When a content of the first copolymer resin is in a range of 10 to 30 wt %, it is possible to improve impact resistance and plating adhesion of a plastic molded product as a final product and block expansion of a plating film by suppressing an increase in a linear expansion coefficient.

Meanwhile, the first copolymer resin may have a weight average molecular weight of 110,000 to 150,000. When the first copolymer resin has a weight average molecular weight of less than 110,000, impact resistance of a plastic molded product as a final product may be degraded. On the other hand, when the first copolymer resin has a weight average molecular weight of greater than 150,000, formability and plating adhesion may be degraded due to excessive aggregation between particles.

(2-2) Second Copolymer Resin

Meanwhile, the thermoplastic resin composition may further include 1 to 15 wt % of a second copolymer resin in which an aromatic vinyl monomer and a vinyl cyanide monomer are copolymerized in a weight ratio of 60 to 80:20 to 40 respectively and which has a weight average molecular weight of 80,000 to 110,000. That is, as the copolymer resin, the same type may be used alone or may be used in combination with a different type having a different weight average molecular weight as necessary. Specifically, when the first copolymer resin is used in combination with the second copolymer resin having a relatively low weight average molecular weight compared to the first copolymer resin, formability, a plating appearance property, and plating adhesion may be further improved.

When a content of the second copolymer resin is greater than 15 wt % with respect to the total weight of the thermoplastic resin composition, impact resistance of a plastic molded product as a final product may be degraded.

Additionally, types and contents of the aromatic vinyl monomer and the vinyl cyanide monomer are the same as described above.

(3) Polycarbonate Resin

The polycarbonate resin may be prepared by reacting a diphenol with phosgene, a halogen formate, or a carbonic acid diester, but the present invention is not limited thereto. For preparation thereof, any known method may be used.

The polycarbonate resin may be one selected from the group consisting of a bisphenol-A-polycarbonate resin, a tetramethyl-polycarbonate resin, a bisphenol-Z-polycarbonate resin, a tetrabromo-polycarbonate resin, a tetraacrylo-polycarbonate resin, and a mixture of two or more thereof, and preferably, may be a bisphenol-A-polycarbonate resin having excellent compatibility and impact resistance, but the present invention is not limited thereto.

A content of the polycarbonate resin may be 30 to 75 wt % with respect to the total weight of the thermoplastic resin composition. When a content thereof is less than 30 wt %, formability may be degraded and impact resistance of a plastic molded product as a final product may also be degraded. On the other hand, when a content thereof is greater than 75 wt %, plating adhesion may be degraded due to excessive aggregation between particles.

In addition, the polycarbonate resin may have a weight average molecular weight of 10,000 to 40,000, preferably, 15,000 to 35,000. When the polycarbonate resin has a weight average molecular weight of greater than 40,000, dispersibility and an elongation ratio of the thermoplastic resin composition may be degraded and impact resistance of a plastic molded product as a final product may also be degraded. On the other hand, even when the polycarbonate resin has a weight average molecular weight of less than 10,000, impact resistance of a plastic molded product may be degraded.

(4) Conductive Filler

The thermoplastic resin composition may include a conductive filler, and a content thereof may be 2 to 8 wt % with respect to the total weight of the thermoplastic resin composition. The conductive filler may provide conductivity to the thermoplastic resin composition and a plastic molded product prepared from the same, and therefore an additional electroless plating process may be omitted during plating a plastic. Accordingly, it is possible to improve an eco-friendly property, and particularly, to significantly improve processing efficiency in terms of both a product and a process.

However, a content of the conductive filler in the thermoplastic resin composition may be adjusted in a predetermined range, for example, 2 to 8 wt %. When a content of the conductive filler is less than 2 wt %, plating adhesion and a plating appearance property may be degraded due to a weak effect of providing conductivity. On the other hand, when a content thereof is greater than 8 wt %, impact resistance of a plastic molded product as a final product may be degraded due to a relatively low content of the graft copolymer resin and the copolymer resin, and dispersibility may also be degraded by an aggregation phenomenon between particles of the conductive filler.

The conductive filler may be one selected from the group consisting of carbon nanotubes, a fullerene, graphene, graphite, carbon fiber, carbon black, and a mixture of two or more thereof, may preferably be carbon nanotubes in consideration of ease of mixing with the thermoplastic resin composition, and may more preferably be multi-walled carbon nanotubes in consideration of commercial obtainability and economic feasibility, but the present invention is not limited thereto.

Particularly, when the carbon nanotubes and the thermoplastic resin composition are mixed, the carbon nanotubes may form a network structure in the thermoplastic resin composition. In this case, if carbon black is added together with the carbon nanotubes as the conductive filler, a plastic molded product may exhibit more uniform conductivity due to a synergistic action between two materials, and therefore adhesion of a plating film may be improved.

That is, the carbon black is inserted into the network structure formed in the thermoplastic resin composition by the carbon nanotubes and fixed, and therefore uniform conductivity may be exhibited compared to when only the carbon nanotubes are applied.

The carbon black itself is a material that has excellent conductivity, but the carbon black also has a characteristic in which carbon particles are easily separated by a scratch or friction, and therefore, has low abrasion resistance. Also, when only carbon black is used as the conductive filler in an excessive amount, formability of a plastic may be degraded.

Therefore, when both the carbon nanotubes and the carbon black are applied as the conductive filler, it is possible to prevent degradation of formability of a plastic by a decrease in a content of the carbon black and simultaneously improve conductivity of a plastic molded product.

(5) Other Additives

The thermoplastic resin composition may further include additives in a predetermined amount in addition to the graft copolymer resin, the copolymer resin, the polycarbonate resin, and the conductive filler as necessary.

The additives may be one selected from the group consisting of a commonly used stabilizer, lubricant, metallic soap, ultraviolet light absorbent, plasticizer, coloring agent (a pigment and a dye), glass fiber, filler such as silica, wood flour, or the like, flame retardant, anti-dripping agent, anti-microbial agent, mold-inhibiting agent, coupling agent, and a mixture of two or more thereof, but the present invention is not limited thereto.

Particularly, the flame retardant provides a flame retardant property to a thermoplastic resin composition having poor thermal properties and combustion resistance. As the flame retardant, a halogen-based flame retardant, an inorganic flame retardant, a phosphorus-based flame retardant, a melanin-based flame retardant may be used according to a component.

The halogen-based flame retardant may be divided into a bromine-based flame retardant and a chlorine-based flame retardant. The bromine-based flame retardant may impart excellent flame retardant effects even in a small amount, but there are problems in which it is difficult to recycle a plastic and toxic environmental contaminants such as dioxins are discharged during combustion.

The inorganic flame retardant may include aluminum hydroxide, antimony oxide, magnesium hydroxide, zinc stannate, a molybdate, guanidine, zirconium, and the like. Among these, aluminum hydroxide has advantages such as a non-toxic property, low fuming property, excellent electrical insulation property, and low costs. However, since the decomposition temperature thereof is 180 to 220° C., aluminum hydroxide may be applied to only a plastic having a low processing temperature, and since a large amount thereof needs to be applied for providing a flame retardant property, mechanical properties and processability of a plastic material may be degraded.

The phosphorus-based flame retardant may include red phosphorus, ammonium phosphate, ammonium polyphosphate, a haloalkyl phosphate, and the like. The phosphorus-based flame retardant exhibits excellent flame retardant effects in a solid phase reaction, and particularly, is effective in a plastic including a large amount of oxygen.

The melanin-based flame retardant may include melanin phosphate, melanin cyanurate, and the like. The melanin-based flame retardant does not generate toxic gases and has low environmental risk due to a small amount of exhaust gas generated during combustion.

Hereinafter, exemplary embodiments will be described in detail with reference to the accompanying drawings.

Example 1

31 parts by weight of a first ABS resin having a polybutadiene rubber content of 59 wt %, a graft ratio of 35%, and a weight average molecular weight of 150,000; 15 parts by weight of a first SAN resin including 74 wt % of styrene and 26 wt % of acrylonitrile and having a weight average molecular weight of 126,000 and a melt index of 12 (based on 3.8 kg at 230° C.); 50 parts by weight of a polycarbonate (PC) resin having a weight average molecular weight of 22,000; and 4 parts by weight of powder-type multi-walled carbon nanotubes (CNTs) having an average diameter of 8 to 15 nm, an average length of 26 μm, and an apparent specific gravity of 0.020 to 0.026 g/mL were input into a Henschel mixer and mixed for 3 minutes. Afterward, the resulting mixture was melt-mixed (a set temperature of a cylinder of 280° C.) using an extruder (32 mmφ) and cut to prepare a pellet-type thermoplastic resin composition for direct plating.

Example 2

A thermoplastic resin composition was prepared in the same manner as in Example 1 except that an amount of input carbon nanotubes (CNTs) was changed to 2 parts by weight and 2 parts by weight of carbon black (CB) was further input.

Example 3

A thermoplastic resin composition was prepared in the same manner as in Example 1 except that an amount of input carbon nanotubes (CNTs) was changed to 6 parts by weight and the amount of polycarbonate (PC) was changes to 48 parts by weight.

Example 4

A thermoplastic resin composition was prepared in the same manner as in Example 1 except that, as an ABS resin, 21 parts by weight of a first ABS resin was used in combination with 10 parts by weight of a second ABS resin having a polybutadiene rubber content of 50 wt %, a graft ratio of 70%, and a weight average molecular weight of 80,000.

Example 5

A thermoplastic resin composition was prepared in the same manner as in Example 4 except that, as a SAN resin, 10 parts by weight of the first SAN resin was used in combination with 5 parts by weight of a second SAN resin including 75.5 wt % of styrene and 24.5 wt % of acrylonitrile and having a weight average molecular weight of 104,000 and a melt index of 39 (based on 3.8 kg at 230° C.).

Comparative Example 1

A thermoplastic resin composition was prepared in the same manner as in Example 1 except that amounts of an input first ABS resin and first SAN resin were changed to 33 parts by weight and 17 parts by weight, respectively, and carbon nanotubes (CNTs) were not input.

Comparative Example 2

A thermoplastic resin composition was prepared in the same manner as in Example 1 except that amounts of an input first ABS resin, first SAN resin, and carbon nanotubes (CNTs) were changed to 33 parts by weight, 16 parts by weight, and 1 part by weight, respectively.

Comparative Example 3

A thermoplastic resin composition was prepared in the same manner as in Example 4 except that amounts of an input first ABS resin and second ABS resin were changed to 17 parts by weight and 14 parts by weight, respectively.

Comparative Example 4

A thermoplastic resin composition was prepared in the same manner as in Example 1 except that amounts of an input first ABS resin, first SAN resin, polycarbonate (PC) resin, and carbon nanotubes (CNTs) were changed to 29 parts by weight, 14 parts by weight, 47 parts by weight, and 10 parts by weight, respectively.

Amounts of components input in Examples 1 to 5 and Comparative Examples 1 to 4 are shown in the following Table 1.

TABLE 1

|  | Example 1 | Example 2 | Example 3 | Example 4 | Example 5 | Comparative Example 1 | Comparative Example 2 | Comparative Example 3 | Comparative Example 4 |
| --- | --- | --- | --- | --- | --- | --- | --- | --- | --- |
| First ABS | 31 | 31 | 31 | 21 | 21 | 33 | 33 | 17 | 29 |
| Second ABS | — | — | — | 10 | 10 | — | — | 14 | — |
| First SAN | 15 | 15 | 15 | 15 | 10 | 17 | 16 | 15 | 14 |
| Second SAN | — | — | — | — | 5 | — | — | — | — |
| PC | 50 | 50 | 48 | 50 | 50 | 50 | 50 | 50 | 47 |
| CNT | 4 | 2 | 6 | 4 | 4 | — | 1 | 4 | 10 |
| CB | — | 2 | — | — | — | — | — | — | — |

(unit: parts by weight)

Experimental Example

The thermoplastic resin compositions according to Examples 1 to 5 and Comparative Examples 1 to 4 were input into an injection molding machine (electric type; 250 ton; commercially available from LSIS CO., Ltd.) to prepare samples having a predetermined shape and size (100×100×3 mm) under conditions of a set temperature of a cylinder of 200° C. and a mold temperature of 60° C. The samples were immersed in a 40° C. cleaner for 3 minutes and then degreased. Afterward, the resulting samples were washed with 20° C. water and immersed in a 69° C. etching solution (400 g/l of chromic acid and 400 g/l of sulfuric acid) for 10 minutes to etch the washed samples. Subsequently, the resulting samples were washed with 20° C. water, pre-dipped in a 35% hydrochloric acid aqueous solution at 35° C. for 1 minute, and then washed with 20° C. water.

The washed samples were electro-plated with copper at room temperature for 60 minutes to form a copper-plated film having a thickness of 30 to 50 washed with 20° C. water, and dried at 80° C. for 2 hours to prepare copper-plated samples. For each of prepared samples, impact resistance, plating adhesion, and a plating appearance property were determined based on the following methods. The results are shown in the following Table 2.

Impact resistance: Izod impact strength was determined based on ASTM D256.

Plating adhesion: A copper-plated sample was cut so as to have a width of 10 mm, and a copper-plated film was released from the sample at an angle of 90° to determine strength (peeling strength). (O: 7 N/cm or more, Δ: greater than or equal to 4 N/cm and less than 7 N/cm, and X: less than 4 N/cm)

Plating appearance property: a surface of a copper-plated sample was determined with the naked eye. (O: no non-adhesion of plating observed and a uniform plating film, Δ: non-adhesion of plating observed or a non-uniform plating film, and X: non-adhesion of plating observed and a non-uniform plating film)

TABLE 2

| Category | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|
| Impact strength (kgf cm/cm) | 25 | 27 | 20 | 23 | 21 | 40 | 35 | 20 | <5 |
| Plating adhesion | Δ | Δ | Δ | O | O | X | X | Δ | X |
| Plating appearance property | O | O | O | O | O | X | X | Δ | X |

Figure 2:
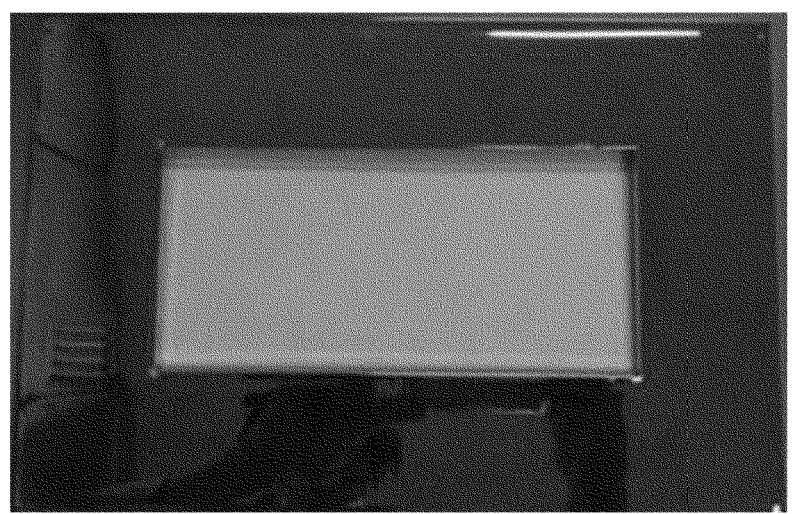
FIG. 2 is an image of a plastic molded product manufactured from a thermoplastic resin composition according to an exemplary embodiment after copper electro-plating.
Figure 3:
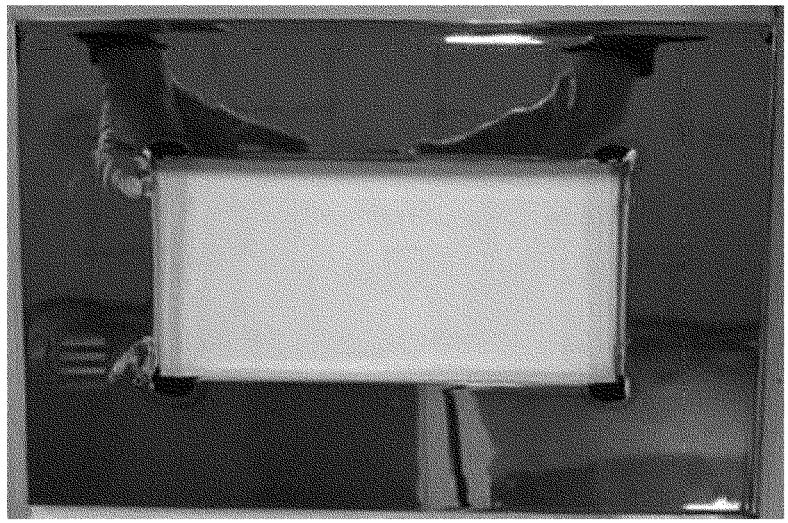
FIG. 3 is an image of a plastic molded product manufactured from a thermoplastic resin composition according to an exemplary embodiment after electro-plating with an alloy of copper, nickel, and chromium.
Figure 4:
FIG. 4 is an image of a plastic molded product manufactured from a thermoplastic resin composition according to a comparative example after copper electro-plating.

Referring to Tables 1 and 2 and FIGS. 1, 2, and 4, it was confirmed that when carbon nanotubes were added as a conductive filler to the thermoplastic resin composition, impact strength slightly decreased but plating adhesion and a plating appearance property were improved. (Compare Example 1 with Comparative Example 1) Also, it was confirmed that when carbon nanotubes were added in an amount of less than 2 parts by weight or greater than 8 parts by weight, plating adhesion and a plating appearance property were significantly degraded.

Comparative Examples 1, 2, and 4

In addition, it was confirmed that when the first ABS resin and the second ABS resin or the first SAN resin and the second SAN resin, all of which have different properties, were used in combination, plating adhesion was further improved. (Examples 4 and 5) However, when the second ABS resin is added in an amount of greater than 12 parts by weight, plating adhesion and a plating appearance property were degraded. (Comparative Example 3)

Meanwhile, it was confirmed that when both carbon nanotubes and carbon black were applied as a conductive filler, plating adhesion and a plating appearance property were exhibited at levels similar to when carbon nanotubes were applied alone, and impact strength was improved. (Examples 1 and 2)

The above description of the present invention is only exemplary, and it will be understood by those skilled in the art that various modifications can be made without departing from the scope of the present invention and changing essential features. Therefore, the above-described embodiments should be considered as only illustrative in all aspects and not for purposes of limitation. For example, each component described as a single type may be realized in a distributed manner, and similarly, components that are described as being distributed may be realized in a coupled manner.

The scope of the present invention is defined by the appended claims, and encompasses all modifications and alterations derived from meanings, the scope and equivalents of the appended claims.

What is claimed is:

1. A thermoplastic resin composition, comprising:
   10 to 35 wt % of a first graft copolymer resin in which 55 to 65 parts by weight of a diene-based rubber polymer and 35 to 45 parts by weight of a monomer mixture, in which an aromatic vinyl monomer and a vinyl cyanide monomer are mixed in a weight ratio of 60 to 80:20 to 40 respectively, are graft-polymerized;
   1 to 12 wt % of a second graft copolymer resin in which 45 to 55 parts by weight of a diene-based rubber polymer and 45 to 55 parts by weight of a monomer mixture, in which an aromatic vinyl monomer and a vinyl cyanide monomer are mixed in a weight ratio of 60 to 80:20 to 40 respectively, are graft-polymerized;
   10 to 30 wt % of a first copolymer resin in which an aromatic vinyl monomer and a vinyl cyanide monomer are copolymerized in a weight ratio of 60 to 80:20 to 40 respectively;
   30 to 75 wt % of a polycarbonate resin; and
   2 to 8 wt % of a conductive filler.

2. The thermoplastic resin composition according to claim 1, wherein the first graft copolymer resin has a graft ratio of 30 to 40%.

3. The thermoplastic resin composition according to claim 1, wherein the second graft copolymer resin has a graft ratio of 65 to 75%.

4. The thermoplastic resin composition according to claim 1, wherein the first copolymer resin has a weight average molecular weight of 110,000 to 150,000.

5. The thermoplastic resin composition according to claim 4, wherein the thermoplastic resin composition further comprises 1 to 15 wt % of a second copolymer resin in which an aromatic vinyl monomer and a vinyl cyanide monomer are copolymerized in a weight ratio of 60 to 80:20 to 40 respectively and which has a weight average molecular weight of 80,000 to 110,000.

6. The thermoplastic resin composition according to claim 1, wherein the diene-based rubber polymer is polybutadiene or polyisoprene.

7. The thermoplastic resin composition according to claim 1, wherein the polycarbonate resin is one selected from the group consisting of a bisphenol-A-polycarbonate resin, a tetramethyl-polycarbonate resin, a bisphenol-Z-polycarbonate resin, a tetrabromo-polycarbonate resin, a tetraacrylo-polycarbonate resin, and a mixture of two or more thereof.

8. The thermoplastic resin composition according to claim 7, wherein the polycarbonate resin has a weight average molecular weight of 10,000 to 40,000.

9. The thermoplastic resin composition according to claim 1, wherein the conductive filler is one selected from the group consisting of carbon nanotubes, a fullerene, graphene, graphite, carbon fiber, carbon black, and a mixture of two or more thereof.

* * * * *